US007940642B2

United States Patent
Chun et al.

(10) Patent No.: US 7,940,642 B2
(45) Date of Patent: May 10, 2011

(54) METHOD FOR GENERATING CODEWORD BASED ON A PLURALITY OF VECTOR COMBINATIONS AND TRANSMITTING THE SAME

(75) Inventors: Jin Young Chun, Anyang-si (KR); Bin Chul Ihm, Anyang-si (KR); Wook Bong Lee, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/451,548

(22) PCT Filed: Jun. 25, 2008

(86) PCT No.: PCT/KR2008/003626
§ 371 (c)(1),
(2), (4) Date: Nov. 18, 2009

(87) PCT Pub. No.: WO2009/002086
PCT Pub. Date: Dec. 31, 2008

(65) Prior Publication Data
US 2010/0118691 A1    May 13, 2010

(30) Foreign Application Priority Data

Jun. 25, 2007  (KR) .......................... 10-2007-0062407

(51) Int. Cl.
*H04J 11/00*       (2006.01)
(52) U.S. Cl. .......................... 370/208; 370/344; 370/479
(58) Field of Classification Search .......... 370/203–209, 370/310–350, 478–480
See application file for complete search history.

(56) References Cited

U.S. PATENT DOCUMENTS

| | | | |
|---|---|---|---|
| 2005/0286402 A1* | 12/2005 | Byun et al. ..................... | 370/203 |
| 2006/0013185 A1* | 1/2006 | Seo et al. ....................... | 370/343 |
| 2006/0120470 A1* | 6/2006 | Hwang et al. ................. | 375/260 |
| 2006/0171295 A1* | 8/2006 | Ihm et al. ....................... | 370/208 |
| 2006/0176803 A1* | 8/2006 | Oh et al. ....................... | 370/210 |

* cited by examiner

*Primary Examiner* — Ricky Ngo
*Assistant Examiner* — Wei-Po Kao
(74) *Attorney, Agent, or Firm* — McKenna Long & Aldridge LLP

(57) ABSTRACT

A method for generating a codeword from a vector generated by combining four symbols P0, P1, P2 and P3 includes generating 16 vectors $V_i$ (i=0~F, where i is an index) by combining the four symbols with repetition allowed, and producing the codeword by mapping data to the 16 vector combinations.

4 Claims, 2 Drawing Sheets

[Fig. 1]
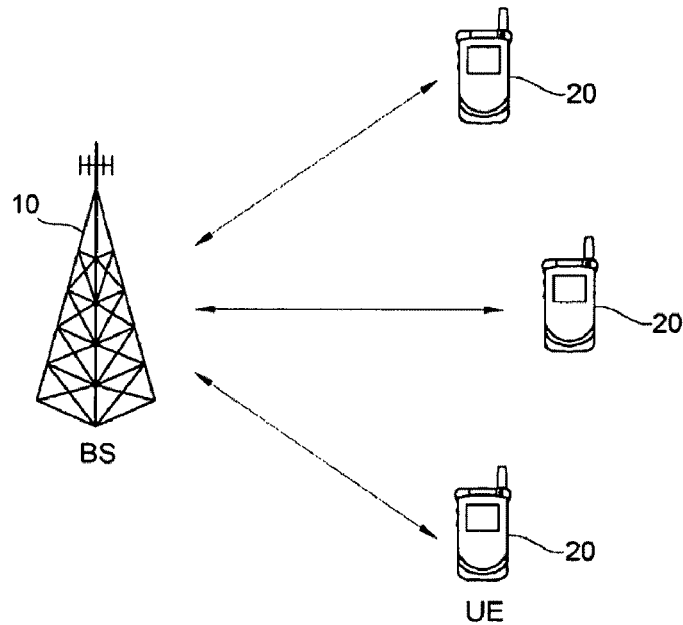
[Fig. 2]
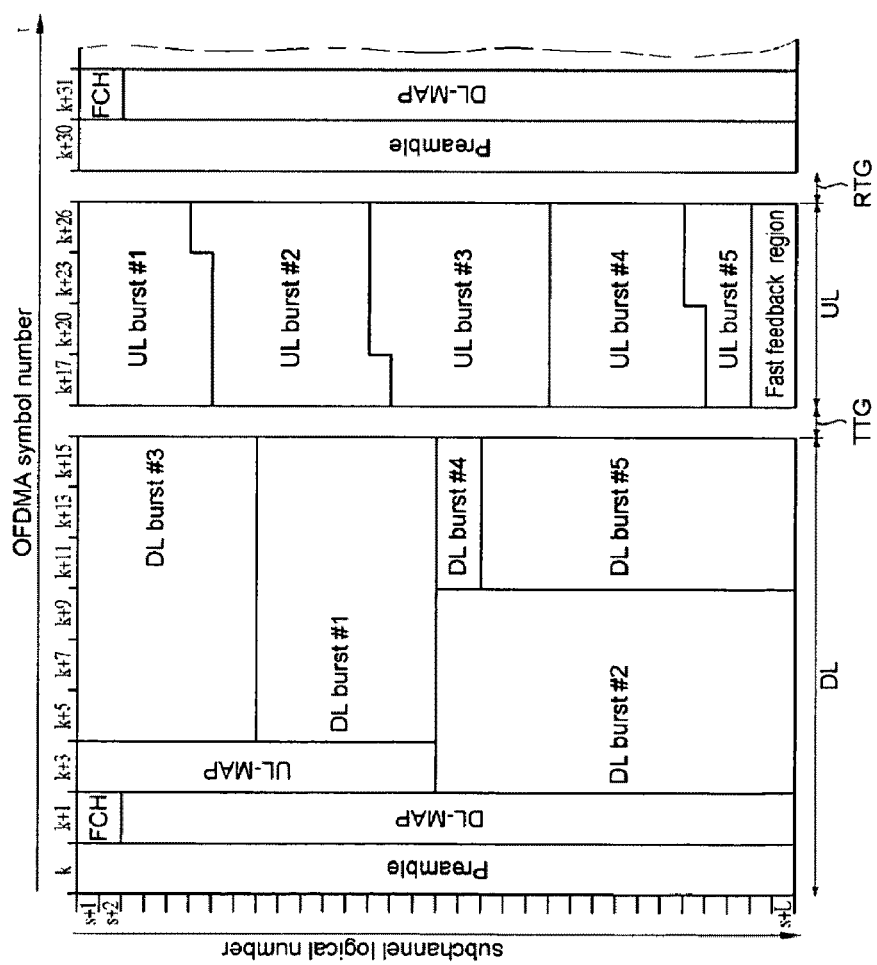

[Fig. 3]
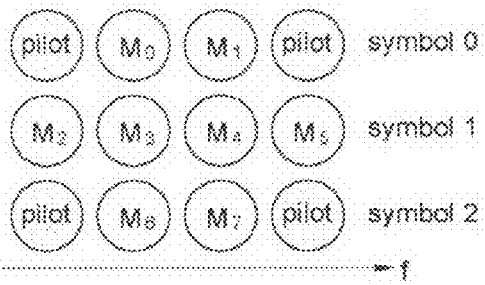
[Fig. 4]
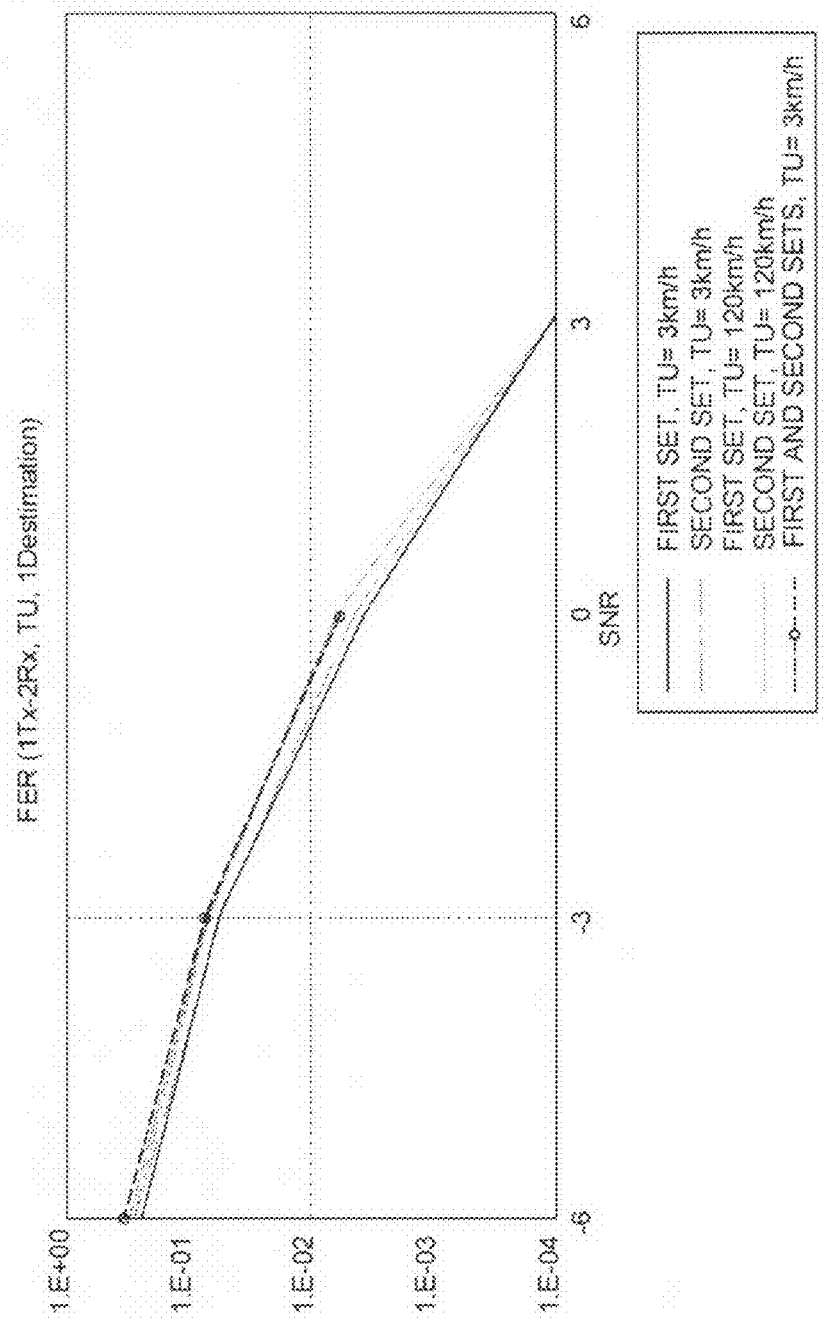

METHOD FOR GENERATING CODEWORD BASED ON A PLURALITY OF VECTOR COMBINATIONS AND TRANSMITTING THE SAME

This application claims priority to International Application No. PCT/KR2008/003626 filed on Jun. 25, 2008, which claims priority to Korean Patent Application No. 10-2007-0062407, filed on Jun. 25, 2007, all of which are incorporated by reference for all purposes as if fully set forth herein.

TECHNICAL FIELD

The present invention relates to a method for generating a codeword and transmitting control information using the same, and more particularly, to a method for representing more types of data by using a predetermined resource region.

BACKGROUND ART

In next generation multimedia mobile communication systems, which have been actively studied in recent years, there is a demand for a system capable of processing and transmitting a variety of information (e.g., video and radio data) in addition to the early-stage voice service.

Orthogonal frequency division multiplexing (OFDM) is a multiple-subcarrier modulation scheme in which data transmission is achieved by dividing a frequency band into a plurality of orthogonal subcarriers. The OFDM is one of noticeable core technologies in the next generation multimedia mobile communication systems. Orthogonal frequency division multiple access (OFDMA) provides multi-user multiplexing by combining the OFDM with frequency division multiple access (FDMA) or time division multiple access (TDMA) or code division multiple access (CDMA).

In general, data is transmitted from a base station (BS) to a user equipment (UE), or from the UE to the BS. The data includes user data for a specific UE or a group of UEs and also includes control information. Hereinafter, downlink (DL) represents transmission from the BS to the UE, and uplink (UL) represents transmission from the UE to the BS. The BS and the UE may include a plurality of transmitter and a plurality of receivers. The transmitter codes the data and thus transmits a codeword by mapping the codeword to a plurality of subcarriers. The receiver obtains the codeword for the data by de-mapping a received signal, and then decodes the codeword to obtain original data.

Examples of the control information include a channel quality indicator (CQI) indicating a channel condition, a precoding matrix indicator (PMI) for a multi-antenna system, a rank indicator (RI), etc. Such control information is periodically or occasionally transmitted to facilitate communication between the BS and the UE. The control information can be represented more precisely by increasing a size of a payload of the control information. For example, if 6-bit CQI is transmitted, the CQI can be represented with a maximum of 64 levels, and if 7-bit CQI is transmitted, the CQI can be represented with a maximum of 128 levels, which enables a further accurate representation of the channel condition. However, since radio resources are limited, the amount of radio resources allocated for user data transmission decreases in proportion to the amount of radio resources allocated for control information transmission. Therefore, the radio resources allocated for control information transmission cannot be increased without limitation.

Accordingly, there is a need for a method capable of transmitting more amounts of control information by using limited radio resources.

DISCLOSURE OF INVENTION

Technical Problem

The present invention provides a method for generating a codeword to represent more types of data by using a predetermined resource region.

The present invention also provides a method for transmitting data by using the generated codeword.

Technical Solution

According to an aspect of the present invention, a method for generating a codeword from a vector generated by combining four symbols P0, P1, P2, and P3, where $$P1 = \exp\left(j \cdot \frac{3\pi}{4}\right),$$

$$P0 = \exp\left(j \cdot \frac{\pi}{4}\right),$$

$$P2 = \exp\left(-j \cdot \frac{3\pi}{4}\right)$$

and $$P3 = \exp\left(-j \cdot \frac{\pi}{4}\right)$$

, is provided. The method includes generating 16 vectors $V_i$ (i=0~F, where i is an index) by combining the four symbols with repetition allowed as follows, $V_0$={P0, P1, P2, P3, P0, P1, P2, P3}, $V_1$={P0, P3, P2, P1, P0, P3, P2, P1}, $V_2$={P0, P0, P1, P1, P2, P2, P3, P3}, $V_3$={P0, P0, P3, P3, P2, P2, P1, P1}, $V_4$={P0, P0, P0, P0, P0, P0, P0, P0}, $V_5$={P0, P2, P0, P2, P0, P2, P0, P2}, $V_6$={P0, P2, P0, P2, P2, P0, P2, P0}, $V_7$={P0, P2, P2, P0, P2, P0, P0, P2}, $V_8$={P0, P3, P2, P2, P1, P1, P0, P0}, $V_9$={P0, P2, P1, P0, P3, P2, P1, P0}, $V_A$={P0, P3, P0, P0, P1, P1, P2, P2}, $V_B$={P0, P0, P1, P2, P3, P0, P1, P2}, $V_C$={P0, P1, P3, P1, P3, P1, P3, P1}, $V_D$={P0, P1, P1, P3, P1, P3, P3, P1}, $V_E$={P0, P1, P3, P1, P1, P3, P1, P3}, $V_F$={P0, P3, P3, P3, P3, P3, P3, P3}, and producing the codeword by mapping data to the 16 vector combinations.

According to another aspect of the present invention, a method for transmitting control information through a sub-channel including a plurality of tiles is provided. The method includes generating a plurality of vectors, each of the plurality of vectors is mapped to one tile, generating a codeword indicating the control information by combining the plurality of vectors; and transmitting the codeword by mapping the codeword to the subchannel, wherein the codeword is generated by using vectors belonging to either a first vector set comprising vectors orthogonal to one another or a second vector set comprising vectors orthogonal to the vectors of the first vector set, and the vectors belonging to the first vector set are not orthogonal to the vectors belonging to the second vector set.

ADVANTAGEOUS EFFECTS

Data of a large number of bits can be represented by using a predetermined number of subcarriers. Therefore, control information can be transmitted with more fragmented levels, thereby being able to represent more types of control information. In addition, since an additional index is not required to identify a type of the control information, an overhead resulted from the transmission of the control information can be reduced.

BRIEF DESCRIPTION OF THE DRAWINGS

FIG. 1 shows an example of a wireless communication system.

FIG. 2 shows an example of a frame structure.

FIG. 3 shows an example of a tile for carrying data.

FIG. 4 is a graph showing a frame error rate (FER) when data is coded and transmitted.

MODE FOR THE INVENTION

Hereinafter, exemplary embodiments of the present invention will be described in detail with reference to the accompanying drawings.

FIG. 1 shows an example of a wireless communication system.

Referring to FIG. 1, the wireless communication system includes a base station (BS) 10 and at least one user equipment (UE) 20. There are one or more cells within the coverage of the BS 10. The wireless communication system can be widely deployed to provide a variety of communication services, such as voices, packet data, etc.

The BS 10 is generally a fixed station that communicates with the UE 20 and may be referred to as another terminology, such as a node-B, a base transceiver system (BTS), an access point, etc. The UE 20 may be fixed or mobile, and may be referred to as another terminology, such as a mobile station (MS), a user terminal (UT), a subscriber station (SS), a wireless device, etc.

The BS 10 and the UE 20 each include a transmitter and a receiver. The BS 10 may include a plurality of transmitters and a plurality of receivers. The UE 20 may include a plurality of transmitters and a plurality of receivers. In uplink, the transmitter may be a part of the UE 20, and the receiver may be a part of the BS 10. In downlink, the transmitter may be a part of the BS 10, and the receiver may be a part of the UE 20.

The wireless communication system may be an orthogonal frequency division multiplexing (OFDM)/orthogonal frequency division multiple access (OFDMA)-based system. The OFDM uses a plurality of orthogonal subcarriers. Further, the OFDM uses an orthogonality between inverse fast Fourier transform (IFFT) and fast Fourier transform (FFT). The transmitter transmits data by performing IFFT. The receiver restores original data by performing FFT on a received signal. The transmitter uses IFFT to combine the plurality of subcarriers, and the receiver uses FFT to split the plurality of subcarriers.

FIG. 2 shows an example of a frame structure. A frame is a data sequence used according to a physical specification in a fixed time duration. The frame may be an OFDMA frame.

Referring to FIG. 2, the frame includes a downlink (DL) frame and an uplink (UL) frame. When a time division duplex (TDD) scheme is used, UL and DL transmissions share the same frequency but are performed in different time periods. The DL frame is temporally prior to the UL frame. The DL frame includes a preamble, a frame control header (FCH), a DL-MAP, a UL-MAP, and a DL burst region. The UL frame includes a UL burst region.

Guard times are provided to identify the UL frame and the DL frame and are inserted to a middle portion (between the DL frame and the UL frame) and a last portion (next to the UL frame) of the frame. A transmit/receive transition gap (TTG) is a gap between a DL burst and a subsequent UL burst. A receive/transmit transition gap (RTG) is a gap between a UL burst and a subsequent DL burst.

A preamble is used between a BS and a UE for initial synchronization, cell search, estimation of a frequency offset and a channel. An FCH includes information regarding a length of a DL-MAP message and a coding scheme of the DL-MAP. The DL-MAP is a region where the DL-MAP message is transmitted. The DL-MAP message defines a connection of a DL channel. The DL-MAP message includes a configuration change count of a downlink channel descriptor (DCD) and a BS identifier (ID). The DCD describes a DL burst profile applied to a current MAP. The DL burst profile indicates characteristics of a DL physical channel. The DCD is periodically transmitted by the BS by using a DCD message. The UL-MAP is a region where a UL-MAP message is transmitted. The UL-MAP message defines a connection of a UL channel. The UL-MAP message includes a configuration change count of an uplink channel descriptor (UCD) and also includes an effective start time of UL assignment defined by the UL-MAP. The UCD describes a UL burst profile. The UL burst profile indicates characteristics of a UL physical channel and is periodically transmitted by the BS by using a UCD message.

A fast-feedback region is included in a portion of the UL frame. The fast-feedback region is assigned for UL data transmission faster than general UL data transmission. Channel quality indicator (CQI), an acknowledgment (ACK)/not-acknowledgment (NACK) signal, or multi-antenna control information may be carried on the fast-feedback region. The fast-feedback region may be located in any link frames, and the location and size of the fast-feedback region are not limited to those shown in FIG. 2.

A slot is a minimum unit of possible data allocation, and is defined by a time and a subchannel. The subchannel may be constructed from a plurality of tiles in UL transmission. The subchannel may be constructed from 6 tiles. In UL transmission, one burst may be composed of three OFDM symbols and one subchannel. In a partial usage of subchannel (PUSC) permutation, each tile may include 4 consecutive subcarriers on three OFDM symbols. The PUSC subcarrier may include 8 data subcarriers and 4 pilot subcarriers. In an optional PUSC permutation, each tile may include three consecutive subcarriers on three OFDM symbols. The optional PUSC subcarrier may include 8 data subcarriers and one pilot subcarrier. Tiles included in the subchannel are deployed across bandwidth in a distributed manner. A bin includes 9 contiguous subcarriers on an OFDM symbol. A band is a group of 4 rows of the bin. An adaptive modulation and coding (AMC) subchannel is composed of 6 contiguous bins in the same band.

FIG. 3 shows an example of a tile for carrying data.

Referring to FIG. 3, one subchannel is constructed from 6 tiles. In a PUSC permutation, each tile may include 4 consecutive subcarriers on three OFDM symbols. The PUSC subcarrier may include 8 data subcarriers and 4 pilot subcarriers. Data is carried on a data subcarrier. The data can be classified into user data and control information. A pilot signal or Null can be carried on a pilot subcarrier. That is, one subchannel may include 48 data subcarriers and 24 pilot subcarriers. The data may be carried by the 48 data subcarriers.

In an optional PUSC permutation, each tile may include three consecutive subcarriers on three OFDM symbols. The optional PUSC subcarrier may include 8 data subcarriers and one pilot subcarrier. One subchannel may include 48 data subcarriers and 6 pilot subcarriers.

In the PUSC and the optional PUSC, tiles included in the subchannel are deployed across bandwidth in a distributed manner.

Now, a method for generating a codeword of data and transmitting the codeword on one subchannel will be described.

The data includes user data and control information. The control information may include a channel quality indicator (CQI) and multiple input multiple output (MIMO) information such as a precoding matrix indicator (PMI), a rank indicator (RI), etc.

To facilitate explanation, it will be assumed that one subchannel includes 6 tiles, and one tile is composed of 8 data subcarriers and 4 pilot subcarriers on the basis of a PUSC permutation. That is, one subchannel includes 48 data subcarriers and 24 pilot subcarriers.

The user data or the control information can be carried on data subcarriers of each tile. Table 1 shows symbols carried on 8 data subcarriers included in one tile.

TABLE 1

| Vector index | Data subcarrier modulation per codeword-subcarrier(0), subcarrier(1), ..., subcarrier(F) |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |
| 8 | P0, P3, P2, P2, P1, P1, P0, P0 |
| 9 | P0, P2, P1, P0, P3, P2, P1, P0 |
| A | P0, P3, P0, P0, P1, P1, P2, P2 |
| B | P0, P0, P1, P2, P3, P0, P1, P2 |
| C | P0, P1, P3, P1, P3, P1, P3, P1 |
| D | P0, P1, P1, P3, P1, P3, P3, P1 |
| E | P0, P1, P3, P1, P1, P3, P1, P3 |
| F | P0, P3, P3, P3, P3, P3, P3, P3 |

One symbol is modulated with one data subcarrier. The 8 symbols carried on one tile constitute one vector. That is, one vector including 8 symbols has a sequence length of 8. A total of 16 types of vectors are configured, and vector indices are in the range of 0 to F.

Symbols constituting each vector can be expressed by Math FIG. 1.

Math Figure 1

$$P0 = \exp\left(j \cdot \frac{\pi}{4}\right)$$
$$P1 = \exp\left(j \cdot \frac{3\pi}{4}\right)$$
$$P2 = \exp\left(-j \cdot \frac{3\pi}{4}\right)$$
$$P3 = \exp\left(-j \cdot \frac{\pi}{4}\right)$$

[Math. 1]

Vectors corresponding to vector indices 0 to 7 are defined as a first vector set. Vectors corresponding to vector indices 8 to F are defined as a second vector set. In the first vector set, vectors having different indices are orthogonal to one another. In the second vector set, vectors having different indices are also orthogonal to one another. The vectors belonging to the first vector set are semi-orthogonal to the vectors belonging to the second vector set.

Relationships between vectors included in the first vector set and the second vector set can be represented by using a minimum distance. For example, the symbols P0, P1, P2, and P3 can be mapped to (0,0), (0,1), (1,1), and (1,0) when quadrature phase-shift keying (QPSK) is used. In this case, a distance between consecutive symbols in the x-axis or the y-axis may be defined as '1', and a distance between diagonally consecutive symbols may be defined as '2'. That is, the distance between P0 and P0 is 0, the distance between P0 and P1 is 1, the distance between P0 and P2 is 2, the distance between P0 and P3 is 1, the distance between P1 and P1 is 0, the distance between P1 and P2 is 1, the distance between P1 and P3 is 2, the distance between P2 and P2 is 0, the distance between P2 and P3 is 1, and the distance between P3 and P3 is 0.

A minimum distance between different vectors included in the first vector set is 8. For example, if a vector {P0, P1, P2, P3, P0, P1, P2, P3} having a vector index '0' is compared with a vector {P0, P3, P2, P1, P0, P3, P2, P1} having a vector index '1', the distance between first symbols is 0, the distance between second symbols is 2, the distance between third symbols is 0, the distance between fourth symbols is 2, the distance between fifth symbols is 0, the distance between sixth symbols is 2, the distance between seventh symbols is 0, and the distance between eighth symbols is 2. Thus, the distance between the vector having the vector index '0' and the vector having the vector index '1' is 8. For all other vectors in the first vector set, the distance between two different vectors is also 8. As the minimum distance between vectors increases, error-robustness is achieved and a decoding performance is improved. A minimum distance between vectors in the second vector set is also 8. However, a minimum distance between a vector belonging to the first vector set and a vector belonging to the second vector set is 7. Although it has been assumed that four symbols are QPSK-mapped, the present invention is not limited thereto. Thus, the minimum distance between vectors can be represented by modulating the symbols in various manners such as binary phase-shift keying (BPSK), 8-PSK, 16-Quadrature amplitude modulation (QAM), 64-QAM, 256-QAM, etc.

There is no limit in the order of the symbols constituting the vectors belonging to the first vector set and the second vector set. Thus, the order of the symbols can be modified in a state that the minimum distance between vectors is maintained. For example, even if first column symbols of all vectors are shifted to last columns, an orthogonality and minimum distance between the vectors are maintained. That is, the symbols of the vectors can be cyclic-shifted.

If user data or control information is carried on one subchannel, the user data or the control information is represented with 6 vectors since one vector is represented on one tile. A codeword of the user data or the control information is generated by using the 6 vectors. Table 2 shows a vector (i.e., a codeword) assigned to each tile.

TABLE 2

| Vector indices per Tile/Tile(0), Tile(1), ..., Tile(5) | | | | | | | |
|---|---|---|---|---|---|---|---|
| 000000 | 111111 | 222222 | 333333 | 444444 | 555555 | 666666 | 777777 |
| 013742 | 102653 | 204716 | 306145 | 403527 | 501374 | 607231 | 705462 |

TABLE 2-continued

| 026534 | 124367 | 217054 | 315607 | 410265 | 512436 | 614573 | 716320 |
|---|---|---|---|---|---|---|---|
| 035276 | 137425 | 231560 | 320471 | 425013 | 527640 | 621705 | 723156 |
| 047163 | 145730 | 243675 | 341026 | 436751 | 534102 | 632047 | 730614 |
| 054621 | 156072 | 250137 | 352764 | 457306 | 546217 | 640352 | 742501 |
| 061457 | 163204 | 265341 | 367512 | 462170 | 560823 | 653410 | 751243 |
| 072315 | 170546 | 276403 | 374250 | 471632 | 573061 | 675124 | 764035 |
| Vector indices per Tile/Tile(0), Tile(1), ..., Tile(5) | | | | | | | |
| 888888 | 999999 | AAAAAA | BBBBBB | CCCCCC | DDDDDD | EEEEEE | FFFFFF |
| 89BFCA | 98AED8 | A8CF9E | B8E9CD | C8BDAF | D89BFC | E8FAB9 | F8DCEA |
| 8AEDBC | 9ACBEF | A9F8DC | B9DE8F | C98AED | D9ACBE | E9CDFB | F9EBA8 |
| 8BDAFE | 9BFCAD | AB9DE8 | BA8CF9 | CAD89B | DAFEC8 | EA9F8D | FAB9DE |
| 8CF9EB | 9CDFB8 | ACBEFD | BC98AE | CBEFD9 | DBC98A | EBA8CF | FB8E9C |
| 8DCEA9 | 9DE8FA | AD89BF | BDAFEC | CDFB8E | DCEA9F | EC8BDA | FCAD89 |
| 8E9CDF | 9EBA8C | AEDBC9 | BEFD9A | CEA9F8 | DE8FAB | EDBC98 | FD9ACB |
| 8FAB9D | 9F8DCE | AFEC8B | BFCAD8 | CF9EBA | DFB8E9 | EFD9AC | FECBBD |

Except for 8 codeword in which the same vector is repeated, a first bit starts with the same vector, a second bit is assigned with 8 types of vectors, and a third bit to a last bit are assigned with arbitrary vectors so that one codeword does not overlap with another codeword.

A codeword is a vector form of the user data or the control information. A first codeword set is a combination of 6 vectors selected from the first vector set. A second codeword set is a combination of 6 vectors selected from the second vector set.

The first codeword set includes 64 codewords. The second codeword set also includes 64 codewords. Therefore, 128 codewords can be represented with one subchannel. Further, the 128 codewords can be represented with 6 tiles. Furthermore, the 128 codewords can be represented with 48 data subcarriers. That is, 128 pieces of user data or control information can be represented with 48 data subcarriers.

Herein, there is only one occasion where the same vector is located at the same sequence number of vector between different codewords. For example, if a codeword '013742' is an example of one codeword whose first bit starts with '0', then another codeword cannot have '1' in a second bit, '3' in a third bit, '7' in a fourth bit, '4' in a fifth bit, and '2' in a sixth bit. That is, the number of overlapping vectors between different codewords is less than or equal to one.

A minimum distance between vectors is 8 in the same vector set. Thus, a minimum distance between codewords within the first codeword set is 8×5=40 because of non-overlapping 5 vectors other than one overlapping vector. A minimum distance between codewords in the second codeword is also 40. On the other hand, since a minimum distance between a vector belonging to the first vector set and a vector belonging to the second vector set is 7, a minimum distance between a codeword of the first codeword set and a codeword of the second codeword set is 7×5=35. Only 3 bits can be transmitted with 8 codewords not having overlapping vectors in the first codeword set or the second codeword set because only 8 ($2^3$) signals can be represented. However, error-robustness can be achieved since the minimum distance between the codewords is 8×6=48.

The first codeword set and the second codeword set are used to carry the user data or the control data on a data subcarrier. The first codeword set and the second codeword set can be used to transmit different types (or the same type) of user data or control information.

When the first codeword set and the second codeword set are used to transmit the different types of user data or control information, 6-bit user data or control information can be transmitted in two ways since each codeword set can represent 64 ($2^6$) signals. For example, the first codeword set may be used to transmit 6-bit CQI, the second codeword set may be used to transmit multi-antenna system's control information (e.g., PMI, RI, etc.).

Further, the first codeword set and the second codeword set may be further fragmented so that the first codeword set is used to transmit CQI of 5 bits (i.e., 32 levels) of a rank 1 and 5-bit CQI of a rank 2 and the second codeword set is used to transmit 5-bit CQI of a rank 3 and 5-bit CQI of a rank 4. In this case, the types of control information can be identified without additional indices since different codewords are used. There is no limit in the types of control information that can be represented with the first codeword set and the second codeword set. Those skilled in the art can easily apply various types of control information.

Conventionally, 64 codewords (6 bits) are represented with 48 data subcarriers. According to the present invention, 128 codewords (7 bits) can be represented with 48 data subcarriers. Thus, more types of control information can be represented. In addition, since no additional index is required to identify the types of control information, an overhead resulted from the transmission of the control information can be reduced.

When the first codeword set and the second codeword set are combined to be used in the transmission of the same type of user data or control information, a minimum distance between codewords is reduced. On the other hand, since 128 ($2^7$) signals can be represented, there is a merit in that 7-bit user data or control information can be transmitted.

Table 3 shows an example of a codeword assigned to a 7-bit payload.

TABLE 3

| 7-bit Payload (binary) | vector indices per Tile Tile(0), Tile(1), ... Tile(5) |
|---|---|
| 0000000 | 0, 0, 0, 0, 0, 0 |
| 0000001 | 1, 1, 1, 1, 1, 1 |
| 0000010 | 2, 2, 2, 2, 2, 2 |
| 0000011 | 3, 3, 3, 3, 3, 3 |
| 0000100 | 4, 4, 4, 4, 4, 4 |
| 0000101 | 5, 5, 5, 5, 5, 5 |
| 0000110 | 6, 6, 6, 6, 6, 6 |
| 0000111 | 7, 7, 7, 7, 7, 7 |
| 0001000 | 2, 4, 3, 6, 7, 5 |
| 0001001 | 3, 5, 2, 7, 6, 4 |
| 0001010 | 0, 6, 1, 4, 5, 7 |
| 0001011 | 1, 7, 0, 5, 4, 6 |
| 0001100 | 6, 0, 7, 2, 3, 1 |
| 0001101 | 7, 1, 6, 3, 2, 0 |
| 0001110 | 4, 2, 5, 0, 1, 3 |
| 0001111 | 5, 3, 4, 1, 0, 2 |
| 0010000 | 4, 3, 6, 7, 5, 1 |

TABLE 3-continued

| 7-bit Payload (binary) | vector indices per Tile Tile(0), Tile(1), ... Tile(5) |
|---|---|
| 0010001 | 5, 2, 7, 6, 4, 0 |
| 0010010 | 6, 1, 4, 5, 7, 3 |
| 0010011 | 7, 0, 5, 4, 6, 2 |
| 0010100 | 0, 7, 2, 3, 1, 5 |
| 0010101 | 1, 6, 3, 2, 0, 4 |
| 0010110 | 2, 5, 0, 1, 3, 7 |
| 0010111 | 3, 4, 1, 0, 2, 6 |
| 0011000 | 3, 6, 7, 5, 1, 2 |
| 0011001 | 2, 7, 6, 4, 0, 3 |
| 0011010 | 1, 4, 5, 7, 3, 0 |
| 0011011 | 0, 5, 4, 6, 2, 1 |
| 0011100 | 7, 2, 3, 1, 5, 6 |
| 0011101 | 6, 3, 2, 0, 4, 7 |
| 0011110 | 5, 0, 1, 3, 7, 4 |
| 0011111 | 4, 1, 0, 2, 6, 5 |
| 0100000 | 6, 7, 5, 1, 2, 4 |
| 0100001 | 7, 6, 4, 0, 3, 5 |
| 0100010 | 4, 5, 7, 3, 0, 6 |
| 0100011 | 5, 4, 6, 2, 1, 7 |
| 0100100 | 2, 3, 1, 5, 6, 0 |
| 0100101 | 3, 2, 0, 4, 7, 1 |
| 0100110 | 0, 1, 3, 7, 4, 2 |
| 0100111 | 1, 0, 2, 6, 5, 3 |
| 0101000 | 7, 5, 1, 2, 4, 3 |
| 0101001 | 6, 4, 0, 3, 5, 2 |
| 0101010 | 5, 7, 3, 0, 6, 1 |
| 0101011 | 4, 6, 2, 1, 7, 0 |
| 0101100 | 3, 1, 5, 6, 0, 7 |
| 0101101 | 2, 0, 4, 7, 1, 6 |
| 0101110 | 1, 3, 7, 4, 2, 5 |
| 0101111 | 0, 2, 6, 5, 3, 4 |
| 0110000 | 5, 1, 2, 4, 3, 6 |
| 0110001 | 4, 0, 3, 5, 2, 7 |
| 0110010 | 7, 3, 0, 6, 1, 4 |
| 0110011 | 6, 2, 1, 7, 0, 5 |
| 0110100 | 1, 5, 6, 0, 7, 2 |
| 0110101 | 0, 4, 7, 1, 6, 3 |
| 0110110 | 3, 7, 4, 2, 5, 0 |
| 0110111 | 2, 6, 5, 3, 4, 1 |
| 0111000 | 1, 2, 4, 3, 6, 7 |
| 0111001 | 0, 3, 5, 2, 7, 6 |
| 0111010 | 3, 0, 6, 1, 4, 5 |
| 0111011 | 2, 1, 7, 0, 5, 4 |
| 0111100 | 5, 6, 0, 7, 2, 3 |
| 0111101 | 4, 7, 1, 6, 3, 2 |
| 0111110 | 7, 4, 2, 5, 0, 1 |
| 0111111 | 6, 5, 3, 4, 1, 0 |
| 1000000 | 8, 8, 8, 8, 8, 8 |
| 1000001 | 9, 9, 9, 9, 9, 9 |
| 1000010 | A, A, A, A, A, A |
| 1000011 | B, B, B, B, B, B |
| 1000100 | C, C, C, C, C, C |
| 1000101 | D, D, D, D, D, D |
| 1000110 | E, E, E, E, E, E |
| 1000111 | F, F, F, F, F, F |
| 1001000 | A, C, B, E, F, D |
| 1001001 | B, D, A, F, E, C |
| 1001010 | 8, E, 9, C, D, F |
| 1001011 | 9, F, 8, D, C, E |
| 1001100 | E, 8, F, A, B, 9 |
| 1001101 | F, 8, E, B, A, 8 |
| 1001110 | C, A, D, 8, 9, B |
| 1001111 | D, B, C, 9, 8, A |
| 1010000 | C, B, E, F, D, 9 |
| 1010001 | D, A, F, E, C, 8 |
| 1010010 | E, 9, C, D, F, B |
| 1010011 | F, 8, D, C, E, A |
| 1010100 | 8, F, A, B, 9, D |
| 1010101 | 9, E, B, A, 8, C |
| 1010110 | A, D, 8, 9, B, F |
| 1010111 | B, C, 9, 8, A, E |
| 1011000 | B, E, F, D, 9, A |
| 1011001 | A, F, E, C, 8, B |
| 1011010 | 9, C, D, F, B, 8 |
| 1011011 | 8, D, C, E, A, 9 |
| 1011100 | F, A, B, 9, D, E |
| 1011101 | E, B, A, 8, C, F |
| 1011110 | D, 8, 9, B, F, C |
| 1011111 | C, 9, 8, A, E, D |
| 1100000 | E, F, D, 9, A, C |
| 1100001 | F, E, C, 8, B, D |
| 1100010 | C, D, F, B, 8, E |
| 1100011 | D, C, E, A, 9, F |
| 1100100 | A, B, 9, D, E, 8 |
| 1100101 | B, A, 8, C, F, 9 |
| 1100110 | 8, 9, B, F, C, A |
| 1100111 | 9, 8, A, E, D, B |
| 1101000 | F, D, 9, A, C, B |
| 1101001 | E, C, 8, B, D, A |
| 1101010 | D, F, B, 8, E, 9 |
| 1101011 | C, E, A, 9, F, 8 |
| 1101100 | B, 9, D, E, 8, F |
| 1101101 | A, 8, C, F, 9, E |
| 1101110 | 9, B, F, C, A, D |
| 1101111 | 8, A, E, D, B, C |
| 1110000 | D, 9, A, C, B, E |
| 1110001 | C, 8, B, D, A, F |
| 1110010 | F, B, 8, E, 9, C |
| 1110011 | E, A, 9, F, 8, D |
| 1110100 | 9, D, E, 8, F, A |
| 1110101 | 8, C, F, 9, E, B |
| 1110110 | B, F, C, A, D, 8 |
| 1110111 | A, E, D, B, C, 9 |
| 1111000 | 9, A, C, B, E, F |
| 1111001 | 8, B, D, A, F, E |
| 1111010 | B, 8, E, 9, C, D |
| 1111011 | A, 9, F, 8, D, C |
| 1111100 | D, E, 8, F, A, B |
| 1111101 | C, F, 9, E, B, A |
| 1111110 | F, C, A, D, 8, 9 |
| 1111111 | E, D, B, C, 9, 8 |

In Table 3, payloads '0000000' to '0111111' correspond to codewords of the first codeword set, and payload '1000000' to '1111111' correspond to codewords of the second codeword set. As such, the 7-bit payload can be carried on one subchannel. Further, the 7-bit payload can be carried on 6 tiles. Furthermore, the 7-bit payload can be carried on 48 data subcarriers.

For example, CQI of 7 bits (i.e., $2^7 = 128$ levels) can be carried on 48 data subcarriers. Assume that a CQI value is 125. Then, a transmitter codes the value '125' into 7 bits, which is represented as '1111100'. Then, a codeword corresponding thereto is selected from Table 3, thereby obtaining the codeword of {D,E,8,F,A,B}. In Table 1, vectors having indices D, E, 8, F, A, and B are respectively assigned to 6 tiles (i.e., tiles 0 to 5) constituting one subchannel and are then modulated. The modulated vectors are transmitted on the control channel. A receiver can obtain a codeword by extracting a vector of CQI received on the control channel. By using the obtained codeword, a bit value '1111100' of the CQI can be obtained.

Since CQI of 128 levels can be represented with 48 data subcarriers, the CQI of more fragmented levels can be transmitted with the same radio resource in comparison with a conventional method in which CQI of 64 levels can be represented with 48 data subcarriers.

The combination of vectors assigned to each payload is shown in Table 3 for exemplary purposes only, and thus the present invention is not limited thereto. Those who skilled in the art can easily modify the number of vector indices, the number of vectors to be combined, and the combination types of vectors. 8-bit data can be carried and transmitted on 48 subcarriers by increasing the number of vector indices shown in Table 1 and by increasing the number of vector combinations shown in Table 2.

FIG. 4 is a graph showing a frame error rate (FER) when data is coded and transmitted. A horizontal axis represents a signal to noise ratio (SNR), and a vertical axis represents the FER.

Referring to FIG. 4, FERs are compared with one another for three difference cases. In the first case, 6-bit data is transmitted at TU=3 km/h and TU=120 km/h by using only the first codeword set configured and selected from the first vector set. In the second case, 6-bit data is transmitted at TU=3 km/h and TU=120 km/h by using only the second codeword set configured and selected from the second vector set. In the third case, 7-bit data is transmitted at TU=3 km/h by using both the first codeword set and the second codeword set. The comparison result shows that there is almost no difference in terms of performances. Although the performances have a slight difference of about 0.3 dB, it can be said that there is almost no difference in the result obtained from system simulation if a performance difference is about 1 to 2 dB.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method for generating a codeword from a vector generated by combining four symbols P0, P1, P2 and P3 in a communication device, where $$P1 = \exp\left(j \cdot \frac{3\pi}{4}\right),$$

$$P0 = \exp\left(j \cdot \frac{\pi}{4}\right),$$

$$P2 = \exp\left(-j \cdot \frac{3\pi}{4}\right)$$

and $$P3 = \exp\left(-j \cdot \frac{\pi}{4}\right),$$

the method comprising:

generating, by the device, 16 vectors $V_i$ (i=0~F, where i is an index) by combining the four symbols with repetition allowed as follows, $V_0$={P0, P1, P2, P3, P0, P1, P2, P3}, $V_1$={P0, P3, P2, P1, P0, P3, P2, P1}, $V_2$={P0, P0, P1, P1, P2, P2, P3, P3}, $V_3$={P0, P0, P3, P3, P2, P2, P1, P1}, $V_4$={P0, P0, P0, P0, P0, P0, P0, P0}, $V_5$={P0, P2, P0, P2, P0, P2, P0, P2}, $V_6$={P0, P2, P0, P2, P2, P0, P2, P0}, $V_7$={P0, P2, P2, P0, P2, P0, P0, P2}, $V_8$={P0, P3, P2, P2, P1, P1, P0, P0}, $V_9$={P0, P2, P1, P0, P3, P2, P1, P0}, $V_A$={P0, P3, P0, P0, P1, P1, P2, P2}, $V_B$={P0, P0, P1, P2, P3, P0, P1, P2}, $V_C$={P0, P1, P3, P1, P3, P1, P3, P1}, $V_D$={P0, P1, P1, P3, P1, P3, P3, P1}, $V_E$={P0, P1, P3, P1, P1, P3, P1, P3}, $V_F$={P0, P3, P3, P3, P3, P3, P3, P3}; and generating, by the device, the codeword by mapping data to the 16 vector combinations.

2. The method of claim 1, wherein the data is control information.

3. The method of claim 1, wherein the $V_0$, $V_1$, $V_2$, $V_3$, $V_4$, $V_5$, $V_6$, and $V_7$ constitute a first vector set, the $V_8$, $V_9$, $V_A$, $V_B$, $V_C$, $V_D$, $V_E$, and $V_F$ constitute a second vector set, and the codeword only comprises vectors belonging to any one of the first and second vector sets.

4. The method of claim 1, wherein one vector is assigned to one tile.

* * * * *